United States Patent
Li

(10) Patent No.: US 10,582,062 B2
(45) Date of Patent: Mar. 3, 2020

(54) CALL TRANSFER DEVICE AND METHOD APPLICABLE IN VEHICLE

(71) Applicants: HONGFUJIN PRECISION ELECTRONICS (ZHENGZHOU) CO., LTD., Zhengzhou (CN); HON HAI PRECISION INDUSTRY CO., LTD., New Taipei (TW)

(72) Inventor: Hong-Liang Li, Zhengzhou (CN)

(73) Assignees: HONGFUJIN PRECISION ELECTRONICS (ZHENGZHOU) CO., LTD., Zhengzhou (CN); HON HAI PRECISION INDUSTRY CO., LTD., New Taipai (TW)

( * ) Notice: Subject to any disclaimer, the term of this patent is extended or adjusted under 35 U.S.C. 154(b) by 0 days.

(21) Appl. No.: 16/446,753

(22) Filed: Jun. 20, 2019

(65) Prior Publication Data

US 2020/0007688 A1 Jan. 2, 2020

(30) Foreign Application Priority Data

Jun. 29, 2018 (CN) .......................... 2018 1 0712100

(51) Int. Cl.
*H04M 3/54* (2006.01)
*H04W 4/16* (2009.01)
*H04M 1/60* (2006.01)

(52) U.S. Cl.
CPC ......... *H04M 3/548* (2013.01); *H04M 1/6091* (2013.01); *H04W 4/16* (2013.01)

(58) Field of Classification Search
CPC ........... H04W 4/02; H04W 4/80; H04W 4/50; H04W 4/16; H04W 48/02; H04W 4/30; H04W 48/16; G06Q 50/30; H04M 3/54; H04M 3/543; H04M 2250/02; H04M 3/42348; H04M 3/548; H04M 1/6091
See application file for complete search history.

(56) References Cited

U.S. PATENT DOCUMENTS

| | | | |
|---|---|---|---|
| 2011/0195699 A1* | 8/2011 | Tadayon | H04B 5/0062 455/418 |
| 2012/0268235 A1* | 10/2012 | Farhan | G05B 9/02 340/3.1 |
| 2014/0073300 A1* | 3/2014 | Leeder | H04B 5/0031 455/416 |
| 2014/0172990 A1* | 6/2014 | Wan | H04W 4/025 709/206 |

* cited by examiner

Primary Examiner — Daniel Lai
(74) Attorney, Agent, or Firm — ScienBiziP, P.C.

(57) ABSTRACT

A call transfer method applicable in a call transfer device for use in a vehicle controls a communication device to communicate with a mobile phone of a driver when a vehicle is started. When an incoming call to the driver is detected, it is determined whether the incoming call meets one or more predetermined conditions before a transfer of the call can take place. A pressure detecting device is installed under every seat for passengers and if the presence of at least one passenger is detected, the incoming call to the driver can be handed off to the phone of the passenger. If no passengers are being carried, other options can be employed in relation to the incoming call.

12 Claims, 4 Drawing Sheets

CALL TRANSFER DEVICE AND METHOD APPLICABLE IN VEHICLE

CROSS-REFERENCE TO RELATED APPLICATIONS

This application claims priority to Chinese Patent Application No. 201810712100.5 filed on Jun. 29, 2018, the contents of which are incorporated by reference herein.

FIELD

The subject matter herein generally relates to communication technology, and particularly to a call transfer device and a call transfer method applicable in a vehicle.

BACKGROUND

Incoming calls can be received when a user is driving, and the user may directly answer the incoming call, such as by a BLUETOOTH earphone or a vehicle telephone. If the driver communicates with the caller himself, the driver's attention may be diverted from driving, and possibility of accident is thus increased.

BRIEF DESCRIPTION OF THE DRAWINGS

Many aspects of the disclosure can be better understood with reference to the following drawings. The components in the drawings are not necessarily drawn to scale, the emphasis instead being placed upon clearly illustrating the principles of the disclosure. Moreover, in the drawings, like reference numerals designate corresponding parts throughout the several views.

DETAILED DESCRIPTION

Figure 1:
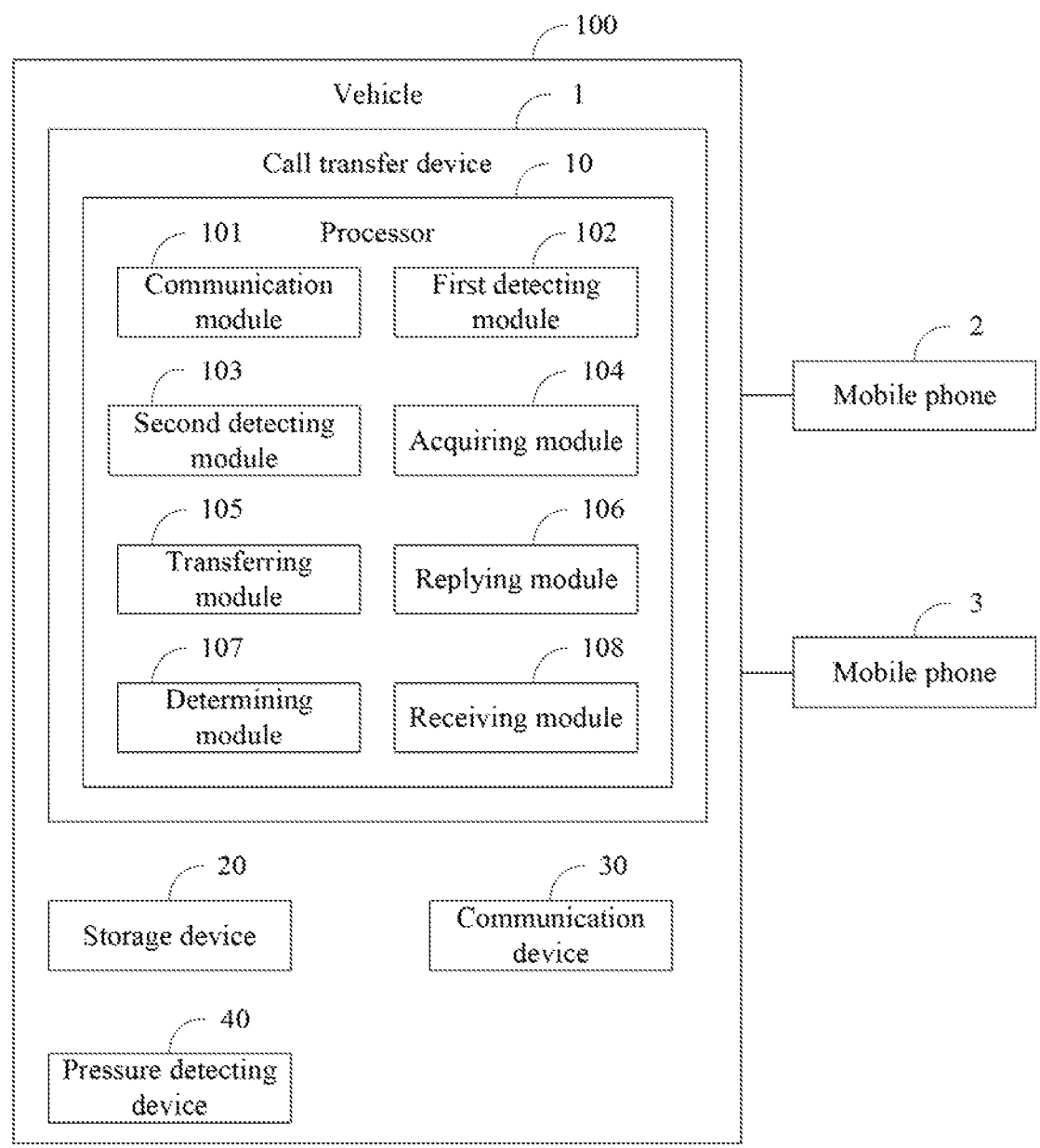
FIG. 1 is a block diagram of an embodiment of a call transfer device.

It will be appreciated that for simplicity and clarity of illustration, where appropriate, reference numerals have been repeated among the different figures to indicate corresponding or analogous elements. In addition, numerous specific details are set forth in order to provide a thorough understanding of the embodiments described herein. However, it will be understood by those of ordinary skill in the art that the embodiments described herein can be practiced without these specific details. In other instances, methods, procedures, and components have not been described in detail so as not to obscure the related relevant feature being described. Also, the description is not to be considered as limiting the scope of the embodiments described herein. The drawings are not necessarily to scale and the proportions of certain parts have been exaggerated to better illustrate details and features of the present disclosure.

The present disclosure, including the accompanying drawings, is illustrated by way of examples and not by way of limitation. Several definitions that apply throughout this disclosure will now be presented. It should be noted that references to "an" or "one" embodiment in this disclosure are not necessarily to the same embodiment, and such references mean "at least one."

Furthermore, the term "module", as used herein, refers to logic embodied in hardware or firmware, or to a collection of software instructions, written in a programming language, such as, Java, C, or assembly. One or more software instructions in the modules can be embedded in firmware, such as in an EPROM. The modules described herein can be implemented as either software and/or hardware modules and can be stored in any type of non-transitory computer-readable medium or other storage device. Some non-limiting examples of non-transitory computer-readable media include CDs, DVDs, BLU-RAY, flash memory, and hard disk drives. The term "comprising" means "including, but not necessarily limited to"; it specifically indicates open-ended inclusion or membership in a so-described combination, group, series, and the like.

FIG. 1 illustrates an embodiment of a call transfer device 1. In at least one embodiment, the call transfer device 1 can be a vehicle telephone, and applied in a vehicle 100. The call transfer device 1 includes, but is not limited to, a processor 10, a storage device 20, a communication device 30, and a number of pressure detecting devices 40. FIG. 1 illustrates only one example of the call transfer device 1, other examples can include more or fewer components than illustrated, or have a different configuration of the various components in other embodiments.

The processor 10 can be a central processing unit (CPU), a microprocessor, or other data processor chip that performs functions of the call transfer device 1.

In at least one embodiment, the storage device 20 can include various types of non-transitory computer-readable storage mediums. For example, the storage device 20 can be an internal storage system, such as a flash memory, a random access memory (RAM) for temporary storage of information, and/or a read-only memory (ROM) for permanent storage of information. The storage device 20 can also be an external storage system, such as a hard disk, a storage card, or a data storage medium.

In at least one embodiment, the communication device 30 can be a BLUETOOTH module. The communication device 30 can communicate with a mobile phone 2 of a driver of the vehicle 100 through BLUETOOTH signals.

In at least one embodiment, the pressure detecting device 40 can be a pressure sensor. Each pressure detecting device 40 is arranged under a seat of the vehicle 2. The pressure detecting device 40 determines whether there is a user sitting on a seat (a non-driving user is referred to as "passenger-user") by detecting pressure applied to the seat.

As illustrated in FIG. 1, the call transfer device 1 includes a communication module 101, a first detecting module 102, a second detecting module 103, an acquiring module 104, a transferring module 105, a replying module 106, a determining module 107, and a receiving module 108. The modules 101-108 can be collections of software instructions stored in the storage device 20 of the call transfer device 1 and executed by the processor 10. The modules 101-108 also can include functionality represented as hardware or integrated circuits, or as software and hardware combinations, such as a special-purpose processor or a general-purpose processor with special-purpose firmware.

When the vehicle 100 is started, the communication module 101 is used to control the communication device 30 to communicate with the mobile phone 2 of the driver in a driver seat of the vehicle 100.

In at least one embodiment, when the driver enters into the vehicle 100, the communication device 30 can automatically communicate with the mobile phone 2 through BLUETOOTH signals. In other embodiments, when the mobile phone 2 is within a predetermined range of the communication device 30 of the call transfer device 1, the mobile phone 2 can receive a connection request from the communication device 30, the driver can input a matching password on the mobile phone 2 to respond the connection request, and the mobile phone 2 can thus connect to the communication device 30 through BLUETOOTH signals. The predetermined range can be a range with a radius of five meters.

The first detecting module 102 is used to detect whether the mobile phone 2 of the driver receives an incoming call, and determine whether the incoming call meets predetermined conditions.

In at least one embodiment, the predetermined conditions can include whether a number of times of the incoming calls from a same phone number is greater than a predetermined number. When the mobile phone 2 receives the incoming call, the mobile phone 2 transmits a signal to the communication device 30, and the first detecting module 102 determines that the mobile phone 2 is receiving the incoming call. In at least one embodiment, the signal includes information as to a phone number corresponding to the incoming call. Thus, the first detecting module 102 can determine the number of times of the incoming calls from the same phone number according to the signal. In at least one embodiment, the predetermined number of times can be three.

In other embodiments, the predetermined conditions can include whether a duration of the incoming call from a same phone number is greater than a predetermined time period. The predetermined time period can be one minute.

When the incoming call meets one or more predetermined conditions, the second detecting module 103 controls each of the pressure detecting devices 40 to detect whether a passenger-user is sitting on a seat other than a driver seat of the vehicle 100.

Figure 2:
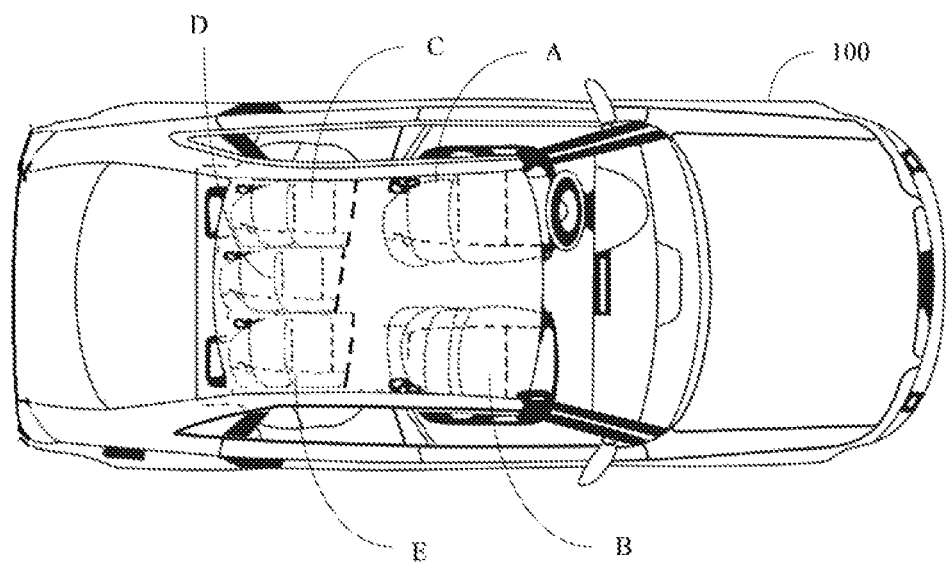
FIG. 2 is a schematic diagram of an embodiment of distribution of seats in a vehicle.

Referring to FIG. 2, for example, five seats are arranged in the vehicle 100, the five seats include a driver seat A, a second driving seat B, and three back seats C, D, and E. The back seat C is arranged behind the driver seat A, the back seat E is arranged behind the second driving seat B, and the back seat D is arranged between the back seat C and the back seat E. The second driving seat B and the back seats C-E are each fitted with one pressure detecting device 40. When the passenger-user is sitting on one of the seats B, C, D, and E, the pressure detecting device 40 under the seat can detect the pressure from the passenger-user, the second detecting module 103 can thus determine that the passenger-user is sitting on the seat.

When the pressure detecting device 40 detects that at least one passenger-user is sitting on the seat, the acquiring module 104 is used to acquire a phone number of the passenger-user.

In at least one embodiment, when the passenger-user is sitting on the seat, the communication device 30 can transmit a BLUETOOTH connection request to a mobile phone 3 of the passenger-user. The passenger-user can control the mobile phone 3 to respond to the BLUETOOTH connection request, the mobile phone 3 of the passenger-user can thus communicate with the communication device 30, and the acquiring module 104 can acquire the phone number of the mobile phone 3 through the communication device 30.

In at least one embodiment, when only one passenger-user is sitting on the seat, the acquiring module 104 can directly acquire the phone number of the mobile phone 3. When a number of passenger-users are sitting on the seats, the acquiring module 104 can acquire the phone number of the user sitting closest to the driver. For example, when the users are sitting on the second driving seat B, the back seat C, the back seat D, and the back seat E, the acquiring module 104 will acquire the phone number of the mobile phone 3 of the passenger-user on the second driving seat B.

In other embodiments, when at least one passenger-user is sitting on the seat, the acquiring module 104 can control the call transfer device 1 to output a message by voice requesting a phone number, and the passenger-user on the seat can speak his/her phone number out. Thereby, the acquiring module 104 can acquire the phone number of the user by recognizing the words spoken by the passenger-user as to his or her phone number.

The transferring module 105 is used to control the mobile phone 2 of the driver to transfer the incoming call to the mobile phone 3 of the passenger-user on the seat according to the acquired phone number.

In at least one embodiment, the transferring module 105 transmits an instruction to the mobile phone 2 of the driver, the instruction includes the phone number of the passenger-user acquired by the acquiring module 104. The transferring module 105 transmits the phone number to the mobile phone 2 of the driver, then the mobile phone 2 transfers the incoming call to the mobile phone 3 of the passenger-user.

When the pressure detecting device 40 does not detect any passenger-user, the replying module 106 is used to control the mobile phone 2 of the driver to issue a predetermined voice message to the incoming call. In at least one embodiment, the content of the predetermined voice can be "Cannot talk, please redial later".

In another embodiment, when the pressure detecting device 40 detects no passenger-user, the transferring module 105 controls the mobile phone 2 of the driver to transfer the incoming call to another phone number pre-stored in the mobile phone 2. In another embodiment, the pre-stored phone number is set by the driver as a relief number for answering the incoming calls, for example, the pre-stored phone number can be a phone owned by a family member, a friend, or an office secretary.

In another embodiment, the storage device 20 stores a number of phone numbers related to the mobile phone 2 of the driver. The related phone numbers are predetermined by the driver, and the users corresponding to the related phone numbers will answer the incoming calls when the users is sitting in the vehicle 100 of the driver. The related phone numbers can be owned by family members, friends, or workmates of the driver. For example, when the user of the related phone number is sitting in the vehicle 100 of the driver, the mobile phone 3 corresponding to the related phone number can receive and answer the transferred call instead of the mobile phone 2 of the driver.

The acquiring module 104 further acquires the number of related phone numbers. The determining module 107 is used to determine whether the phone number of the passenger-user on the seat is one of the number of phone numbers stored in the storage device 20. When the determining module 107 determines that the phone number is one of the number of phone numbers stored in the storage device 20, the transferring module 105 controls the mobile phone 2 of the driver to transfer the incoming call to the mobile phone 3 of the passenger-user.

In another embodiment, when the pressure detecting device 40 detects at least one passenger-user, the receiving module 108 receives location information of the mobile phone 2 of the driver and the mobile phone 3 corresponding to the related phone number. In at least one embodiment, the location information can include longitude and latitude information.

In another embodiment, the mobile phone 2 of the driver and the mobile phone 3 of the passenger-user both include a GPS module. The receiving module 108 can receive the location information of the mobile phone 2 detected by the GPS module through the BLUETOOTH communication. The mobile phone 3 can upload the location information to a remote server, the receiving module 108 can control the communication device 30 to access the remote server, and thereby receive the location information of the mobile phone 3.

The determining module 107 further determines whether a distance between the mobile phone 2 of the driver and the mobile phone 3 of the passenger-user is within a predetermined distance. In at least one embodiment, the predetermined distance can be two meters.

When the distance between the mobile phone 2 and the mobile phone 3 is within the predetermined distance, the transferring module 105 controls the mobile phone 2 of the driver to transfer the incoming call to mobile phone 3 of the passenger-user.

In another embodiment, when the distances between the mobile phone 2 and multiple mobile phones 3 are within the predetermined distance, the transferring module 105 controls the mobile phone 2 of the driver to transfer the incoming call to the mobile phone 3 which is closest.

Figure 3:
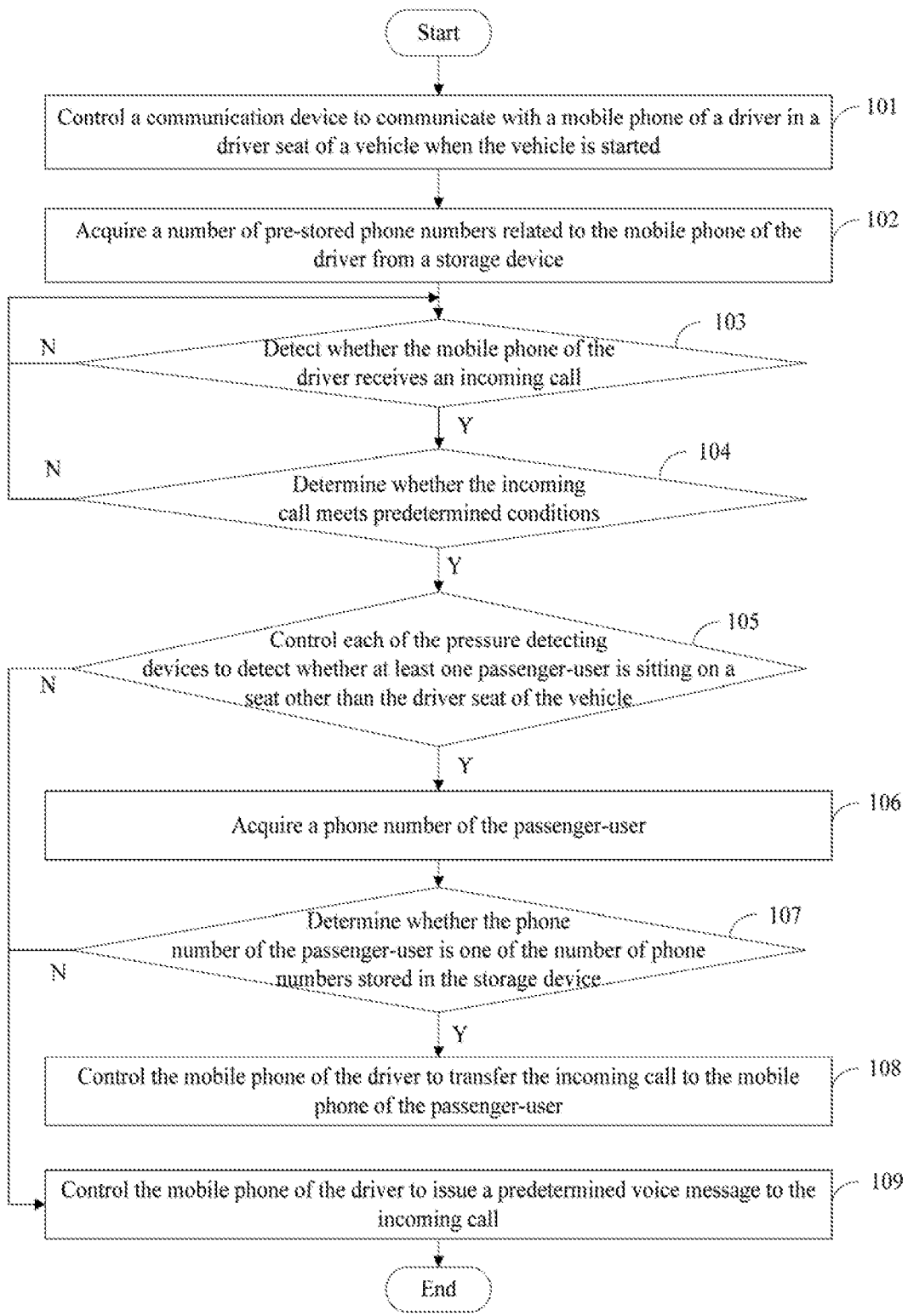
FIG. 3 illustrates a flowchart of an embodiment of a call transfer method.

FIG. 3 illustrates a flowchart of an embodiment of a call transfer method. The method is provided by way of example, as there are a variety of ways to carry out the method. The method described below can be carried out using the configurations illustrated in FIG. 1, for example, and various elements of these figures are referenced in explaining the example method. Each block shown in FIG. 3 represents one or more processes, methods, or subroutines carried out in the example method. Furthermore, the illustrated order of blocks is by example only and the order of the blocks can be changed. Additional blocks may be added or fewer blocks may be utilized, without departing from this disclosure. The example method can begin at block 101.

At block 101, when the vehicle 100 is started, the communication module 101 controls the communication device 30 to communicate with the mobile phone 2 of the driver in the driver seat of the vehicle 100.

At block 102, the acquiring module 104 acquires a number of pre-stored phone numbers related to the mobile phone 2 of the driver from the storage device 20.

At block 103, the first detecting module 102 detects whether the mobile phone 2 of the driver receives an incoming call. When the first detecting module 102 detects that the mobile phone 2 of the driver receives the incoming call, the process jumps to block 104. When the first detecting module 102 detects that the mobile phone 2 of the driver does not receive the incoming call, the process continues block 103.

At block 104, the first detecting module 102 further determines whether the incoming call meets predetermined conditions. When the incoming call meets the predetermined conditions, the process jumps to block 105. When the incoming call does not meet the predetermined conditions, the process goes back to block 103.

At block 105, the second detecting module 103 controls each of the pressure detecting devices 40 to detect whether at least one passenger-user is sitting on a seat other than the driver seat of the vehicle 100. When the pressure detecting device 40 detects that at least one passenger-user is sitting on the seat in the vehicle 100, the process jumps to block 106. When the pressure detecting device 40 detects that no passenger-user is sitting on the seat in the vehicle, the process jumps to block 109.

At block 106, the acquiring module 104 further acquires a phone number of the passenger-user.

At block 107, the determining module 107 determines whether the phone number of the passenger-user is one of the number of phone numbers stored in the storage device 20. When the determining module 107 determines that the phone number of the passenger-user is one of the number of phone numbers stored in the storage device 20, the process jumps to block 108. When the determining module 107 determines that the phone number of the passenger-user is not any one of the number of phone numbers stored in the storage device 20, the process jumps to block 109.

At block 108, the transferring module 105 controls the mobile phone 2 of the driver to transfer the incoming call to the mobile phone 3 of the passenger-user.

At block 109, the replying module 106 controls the mobile phone 2 of the driver to issue a predetermined voice message to the incoming call.

Figure 4:
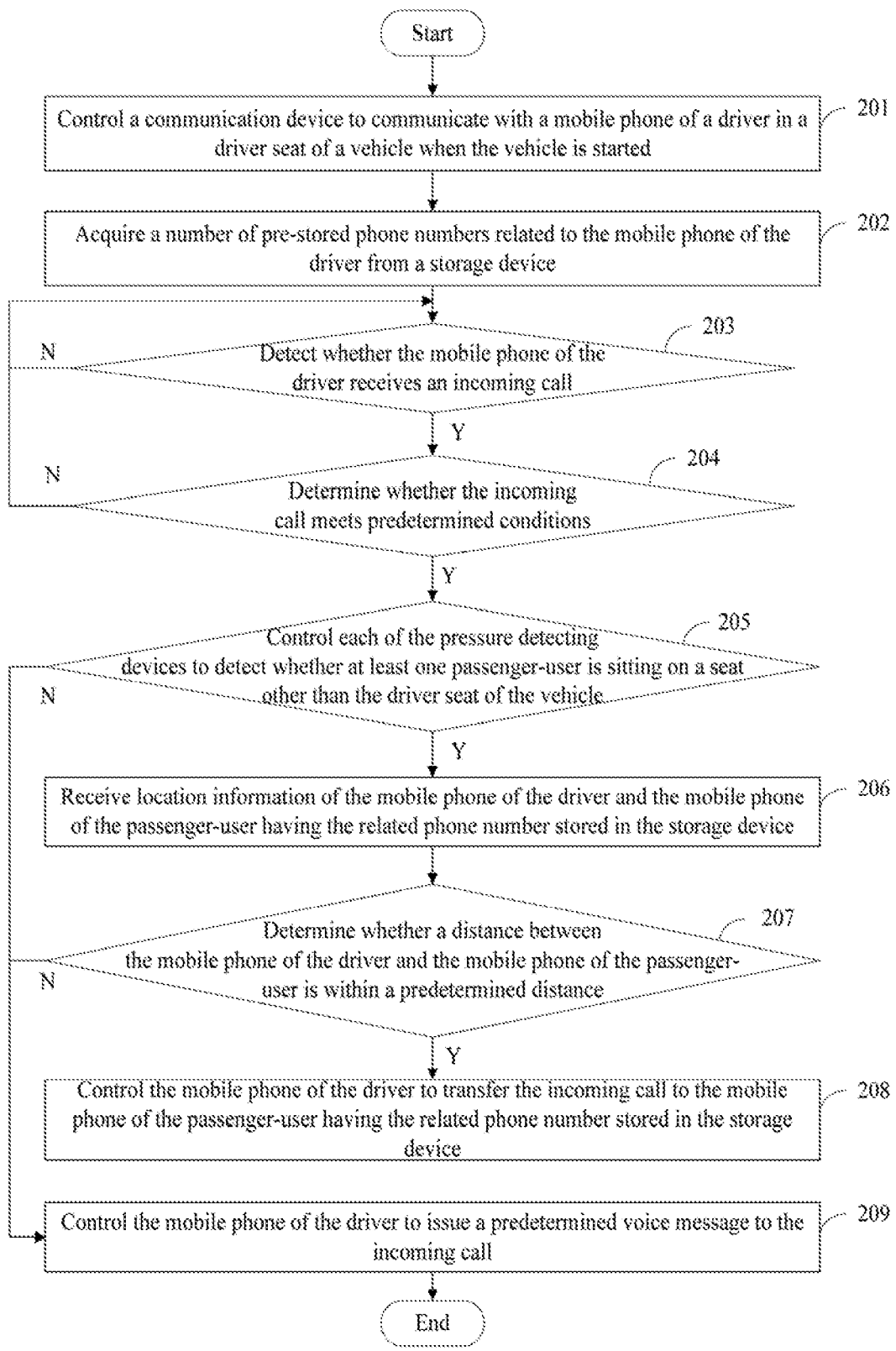
FIG. 4 illustrates a flowchart of another embodiment of a call transfer method.

FIG. 4 illustrates a flowchart of another embodiment of a call transfer method. The method is provided by way of example, as there are a variety of ways to carry out the method. The method described below can be carried out using the configurations illustrated in FIG. 1, for example, and various elements of these figures are referenced in explaining the example method. Each block shown in FIG. 4 represents one or more processes, methods, or subroutines carried out in the example method. Furthermore, the illustrated order of blocks is by example only and the order of the blocks can be changed. Additional blocks may be added or fewer blocks may be utilized, without departing from this disclosure. The example method can begin at block 201.

At block 201, when the vehicle 100 is started, the communication module 101 controls the communication device 30 to communicate with the mobile phone 2 of the driver in the driver seat of the vehicle 100.

At block 202, the acquiring module 104 acquires a number of pre-stored phone numbers related to the mobile phone 2 of the driver from the storage device 20.

At block 203, the first detecting module 102 detects whether the mobile phone 2 of the driver receives an incoming call. When the first detecting module 102 detects that the mobile phone 2 of the driver receives the incoming call, the process jumps to block 204. When the first detecting module 102 detects that the mobile phone 2 of the driver does not receive the incoming call, the process continues block 203.

At block 204, the first detecting module 102 determines whether the incoming call meets predetermined conditions. When the incoming call meets the predetermined conditions, the process jumps to block 205. When the incoming call does not meet the predetermined conditions, the process goes back to block 203.

At block 205, the second detecting module 103 controls each of the pressure detecting devices 40 to detect whether at least one passenger-user is sitting on a seat other than the driver seat of the vehicle 100. When the pressure detecting device 40 detects that at least one passenger-user is sitting on the seat in the vehicle 100, the process jumps to block 206. When the pressure detecting device 40 detects that no passenger-user is sitting on the seat in the vehicle, the process jumps to block 209.

At block 206, the receiving module 108 receives location information of the mobile phone 2 of the driver and the mobile phone 3 of the passenger-user having the related phone number stored in the storage device 20.

At block 207, the determining module 107 further determines whether a distance between the mobile phone 2 of the driver and the mobile phone 3 of the passenger-user is within a predetermined distance. When the distance between the mobile phone 2 of the driver and the mobile phone 3 of the passenger-user is within the predetermined distance, the process jumps to block 208. When the distance between the mobile phone 2 of the driver and the mobile phone 3 of the passenger-user is not within the predetermined distance, the process jumps to block 209.

At block 208, the transferring module 105 controls the mobile phone 2 of the driver to transfer the incoming call to the mobile phone 3 of the passenger-user having the related phone number stored in the storage device 20.

At block 209, the replying module 106 controls the mobile phone 2 of the driver to issue a predetermined voice message to the incoming call.

It is believed that the present embodiments and their advantages will be understood from the foregoing description, and it will be apparent that various changes may be made thereto without departing from the spirit and scope of the disclosure or sacrificing all of its material advantages, the examples hereinbefore described merely being embodiments of the present disclosure.

What is claimed is:

1. A call transfer device applicable in a vehicle comprising:
    at least one processor;
    a communication device coupled to the at least one processor;
    a plurality of pressure detecting devices coupled to the at least one processor; and
    a storage device coupled to the at least one processor and storing instructions for execution by the at least one processor to cause the at least one processor to:
    control, when the vehicle is started, the communication device to communicate with a mobile phone of a driver;
    detect whether the mobile phone of the driver receives at least one incoming call;
    determine whether the at least one incoming call meets predetermined conditions;
    control, when the at least one incoming call meets the predetermined conditions, each of the pressure detecting devices to detect whether at least one passenger-user is sitting on a seat other than a driver seat of the vehicle;
    acquire, when the pressure detecting device detects that at least one passenger-user is sitting on the seat, a phone number of the passenger-user; and
    control the mobile phone of the driver to transfer the incoming call to the mobile phone of the passenger-user.

2. The call transfer device according to claim 1, wherein the at least one processor is further caused to:
    control, when the pressure detecting device detects that no passenger-user is sitting on the seat, the mobile phone of the driver to issue a predetermined voice message to a phone number of the incoming call.

3. The call transfer device according to claim 1, wherein the predetermined conditions comprise whether a number of times of incoming calls from a same phone number is greater than a predetermined number.

4. The call transfer device according to claim 1, wherein the predetermined conditions comprise whether a duration of an incoming call is greater than a predetermined time period.

5. The call transfer device according to claim 1, wherein the storage device stores a plurality of phone numbers related to the mobile phone of the driver, the at least one processor is further caused to:
    determine whether the phone number of the passenger-user is one of the plurality of phone numbers stored in the storage device; and
    control, when the phone number of the passenger-user is one of the plurality of phone numbers stored in the storage device, the mobile phone of the driver to transfer the incoming call to the mobile phone of the passenger-user.

6. The call transfer device according to claim 5, wherein the at least one processor is further caused to:
    acquire location information of the mobile phone of the driver and the mobile phone of the passenger-user;
    determine whether a distance between the mobile phone of the driver and the mobile phone of the passenger-user is within a predetermined distance; and
    control, when the distance between the mobile phone of the driver and the mobile phone of the passenger-user is within the predetermined distance, the mobile phone of the driver to transfer the incoming call to the mobile phone of the passenger-user.

7. A call transfer method applicable in a call transfer device comprising:
    controlling, when a vehicle is started, a communication device to communicate with a mobile phone of a driver in a driver seat of the vehicle;
    detecting whether the mobile phone of the driver receives at least one incoming call;
    determining whether the at least one incoming call meets predetermined conditions;
    controlling, when the at least one incoming call meets the predetermined conditions, each of the pressure detecting devices to detect whether at least one passenger-user is sitting on a seat other than the driver seat of the vehicle;
    acquiring, when the pressure detecting device detects that at least one passenger-user is sitting on the seat, a phone number of the passenger-user; and
    controlling the mobile phone of the driver to transfer the incoming call to the mobile phone of the passenger-user.

8. The method according to claim 7, further comprising:
    controlling, when the pressure detecting device detects that no passenger-user is sitting on the seat, the mobile phone of the driver to issue a predetermined voice message to a phone number of the incoming call.

9. The method according to claim 7, wherein the predetermined conditions comprise whether a number of times of incoming calls from a same phone number is greater than a predetermined number.

10. The method according to claim 7, wherein the predetermined conditions comprise whether a duration of an incoming call is greater than a predetermined time period.

11. The method according to claim 7, wherein a storage device of the call transfer device stores a plurality of phone numbers related to the mobile phone of the driver, the method further comprises:
    determining whether the phone number of the passenger-user is one of the plurality of phone numbers stored in the storage device; and controlling, when the phone number of the passenger-user is one of the plurality of phone numbers stored in the storage device, the mobile phone of the driver to transfer the incoming call to the mobile phone of the passenger-user.

12. The method according to claim 11, further comprising:
  acquiring location information of the mobile phone of the driver and the mobile phone of the passenger-user;
  determining whether a distance between the mobile phone of the driver and the mobile phone of the passenger-user is within a predetermined distance; and
  controlling, when the distance between the mobile phone of the driver and the mobile phone of the passenger-user is within the predetermined distance, the mobile phone of the driver to transfer the incoming call to the mobile phone of the passenger-user.

\* \* \* \* \*